(12) United States Patent
Oku et al.

(10) Patent No.: US 11,187,835 B2
(45) Date of Patent: Nov. 30, 2021

(54) EDIBLE RETROREFLECTIVE MATERIAL FORMED FROM AGAR

(71) Applicant: Gunma University, Maebashi (JP)

(72) Inventors: Hiromasa Oku, Maebashi (JP); Takahiro Uji, Maebashi (JP)

(73) Assignee: Gunma University, Maebashi (JP)

( * ) Notice: Subject to any disclaimer, the term of this patent is extended or adjusted under 35 U.S.C. 154(b) by 98 days.

(21) Appl. No.: 16/487,790

(22) PCT Filed: Dec. 8, 2017

(86) PCT No.: PCT/JP2017/044137
§ 371 (c)(1),
(2) Date: Aug. 21, 2019

(87) PCT Pub. No.: WO2018/154916
PCT Pub. Date: Aug. 30, 2018

(65) Prior Publication Data
US 2020/0025983 A1 Jan. 23, 2020

(30) Foreign Application Priority Data
Feb. 21, 2017 (JP) .............................. JP2017-029553

(51) Int. Cl.
*G02B 5/124* (2006.01)
(52) U.S. Cl.
CPC .................... *G02B 5/124* (2013.01)
(58) Field of Classification Search
None
See application file for complete search history.

(56) References Cited

U.S. PATENT DOCUMENTS

| 3,222,986 A * | 12/1965 | Altman | G03G 9/08 353/66 |
|---|---|---|---|
| 6,249,271 B1 * | 6/2001 | Albert | C09D 11/30 345/107 |
| 2004/0170725 A1 | 9/2004 | Begleiter | |

(Continued)

FOREIGN PATENT DOCUMENTS

| JP | 2004-537304 A | 12/2004 |
|---|---|---|
| JP | 2010-159085 A | 7/2010 |

(Continued)

OTHER PUBLICATIONS

Berge, B. et al., "Variable focal lens controlled by an external voltage: An application of electrowetting", The European Physical Journal E, 2000, vol. 3, pp. 159-163.

(Continued)

*Primary Examiner* — Jennifer D. Carruth
(74) *Attorney, Agent, or Firm* — Seed IP Law Group LLP

(57) ABSTRACT

A retroreflective material having high retroreflective performance while being edible is provided with a reflector main body that has optical transparency. The reflector main body is formed from agar. One side of the reflector main body constitutes an incident surface where incident light enters into the reflector main body. The other side of the reflector main body is formed as a retroreflective surface that reflects incident light that has entered to an inner part of the reflector main body in a direction substantially parallel to an incident direction.

17 Claims, 3 Drawing Sheets

(56) References Cited

U.S. PATENT DOCUMENTS

2012/0188640 A1 7/2012 Omenetto et al.
2016/0299269 A1 10/2016 Parmanen et al.

FOREIGN PATENT DOCUMENTS

JP 2012-533780 A 12/2012
JP 2017-503215 A 1/2017

OTHER PUBLICATIONS

Kuiper, S. et al., "Variable-focus liquid lens for miniature cameras", Applied Physics Letters, 2004, vol. 85, No. 7, pp. 1128-1130.
Oku, H. et al., "High-speed liquid lens with 2 ms response and 80.3 nm root-mean-square wavefront error", Applied Physics Letters, 2009, vol. 94, p. 221108.
De Gennes, P-G, Wyart, F. B, and D. Quéré, Science of Surface Tension: Surface Boundaries of Drips, Bubbles, Drops, and Waves, Yoshioka Shoten Publishing, 2004 (with English translation of relevant portion of text) (5 pages).
Bunton, P., "Edible optics: Using gelatin to demonstrate properties of light", Phys. Teach, 1997, vol. 35, p. 421.
International Search Report, dated Jan. 23, 2018, for International Application No. PCT/JP2017/044137, 2 pages.
Extended European Search Report for Application No. 17897241.0 dated Oct. 19, 2020, 8 pgs.
Wilk, S., "Edible Optics", Optics and Photonics News., vol. 25, No. 12, Dec. 1, 2014, pp. 25-27.
Uji, T. et al., "Edible Retroreflector", Proceedings of VRST '17, Virtual Reality Software and Technology, ACM, Nov. 8-10, 2017, 8 pages.

* cited by examiner

EDIBLE RETROREFLECTIVE MATERIAL FORMED FROM AGAR

BACKGROUND

Technical Field

The present disclosure relates to a retroreflective material.

Description of the Related Art

In recent years there has been remarkable advancement in new optical device technology that uses liquids, as exemplified by a liquid lens (refer to non-patent publications 1-3 below). Liquids are often transparent to visible light, and are also smooth at an angstrom precision at their boundary surface (refer to non-patent publication 4 below). This means that it is possible to realize a high precision refracting interface if appropriately formed, and it will be understood that they are materials that are excellent for realizing optical devices.

Incidentally, many food materials are liquids. If jelly is considered as a representative example, jelly is produced by dissolving an agar or polysaccharide thickener, or gelatin comprised of proteins, that are polymers in hot liquid, and then causing gelation by lowering the temperature of the hot liquid. The main component of jelly is water, which is highly transparent to visible light. Also, since it is also possible to shape by putting in to molds, in principle it is would be easy to control the surface shape of the jelly. These characteristics are all necessary in optical device formation, and food materials in liquid form having these characteristics can be said to be suitable as optical device materials.

In this manner, some kinds of food have excellent characteristics as materials for optical devices, and until now there have been reports proposing making lenses out of sweets for use in education relating to optics (refer to non-patent publication 5 below).

CITATION LIST

Non-Patent Publications

Non-Patent Publication 1:
Berge, B. and Peseux, J. Variable focal lens controlled by an external voltage: An application of electrowetting. The European Physical Journal E, 2000, vol. 3, p. 159-163.
Non-Patent Publication 2:
Kuiper, S. and Hendriks, B. H. W. Variable-focus liquid lens for miniature cameras. Applied Physics Letters, 2004, vol. 85, no. 7, p. 1128-1130.
Non-Patent Publication 3:
Oku, H. and Ishikawa, M. High-speed liquid lens with 2 ms response and 80.3 nm root-mean-square wavefront error. Applied Physics Letters, 2009, vol. 94, p. 221108.
Non-Patent Publication 4:
de Genne, P-G, Whart, F. B, and D. Quéré, Science of Surface Tension: Surface Boundaries of Drips, Bubbles, Drops, and Waves, Yoshioka Shoten Publishing, 2004
Non-Patent Publication 5:
Bunton, P. Edible optics: Using gelatin to demonstrate properties of light, Phys. Teach, 1997, vol. 35, p. 421.

BRIEF SUMMARY

The present inventors have studied the benefits of optical markers that use foodstuff, particularly retroreflective materials, by subjecting retroreflective materials that can be eaten (in this specification this will be referred to as "edible") to various tests.

There are two main advantages of an edible retroreflective material that can be considered.

The first advantage is that an optical device is mounted directly on a food item, etc., that is eaten by a person. For example, if placement on a food is possible, it becomes easy to recognize food from a camera, and optical devices taking performance in a new direction are conceivable, such as performing projection mapping on a wedding cake brought in at a wedding ceremony. However, many conventional optical devices are made of materials that cannot be eaten, such as glass, plastic etc. This means that in a case of having been placed on food, is it necessary to remove before eating, and there is a danger of toxicity in the material, and there is a risk of accidental ingestion. If there is an optical device formed with foodstuff, these problems no longer exist, and it is secure and safe even if placed in food.

The second advantage is that if there is an edible retroreflective material, it will be suitable for placing within a person's mouth, or on the surface of the digestive tract. If a retroreflective material is placed in the digestive tract, a function as a reference point for operation navigation is conceivable, and since there is also the possibility of application to optical measurement, it is also possible to expect that this will contribute to making measurement high precision, etc. If there is an optical device formed of food, it is conceivable that there will be almost no toxicity or effect on the human body, and since food is naturally digested even if it is taken into the body, it is conceivable that there will be the advantage that there is no collection procedure.

The present inventors have performed various experiments in order to realize a retroreflective material using food they are familiar with, on the particular assumption of application to food that was described earlier as the first advantage. As result, it was found that in a case where agar was used, in particular, a retroreflective performance was high.

The present disclosure has been conceived in view of the previously described knowledge. The present disclosure provides a retroreflective material having high retroreflective performance while being edible. The present disclosure also provides a manufacturing method suitable for the manufacture of such a retroreflective material.

Means for solving the above described problem can be described as in the following aspects.

(Aspect 1)

A retroreflective material provided with a reflector main body having optical transparency, wherein the reflector main body is formed from agar, one surface side of the reflector main body constitutes a plane of incidence where incident light enters to an inner part of the reflector main body, and the other side of the reflector main body is formed as a retroreflective surface that reflects incident light that has entered to an inner part of the reflector main body in a direction substantially parallel to an incident direction.

(Aspect 2)

The retroreflective material of aspect 1, wherein the retroreflective surface is made a corner cube type retroreflector surface.

(Aspect 3)

The retroreflective material of aspect 1 or aspect 2, wherein a refractive index adjustment material that increases refractive index of the reflector main body is added to the agar constituting the reflector main body.

(Aspect 4)

A manufacturing method for a retroreflective material, comprising a step of obtaining an agar solution by adding agar material to water and heating, a step of transferring a shape of a base material surface having a shape of a corner cube type retroreflective surface to the agar solution by bringing the agar solution into contact with the base material surface, and a step of forming a retroreflective material having a retroreflective surface by causing the agar solution, in a state of having been brought into contact with the base material surface, to solidify.

According to the present disclosure, it becomes possible to provide a retroreflective material having high retroreflective performance while being edible. It also becomes possible to provide a manufacturing method applicable to manufacture of such a retroreflective material.

DETAILED DESCRIPTION

Figure 1:
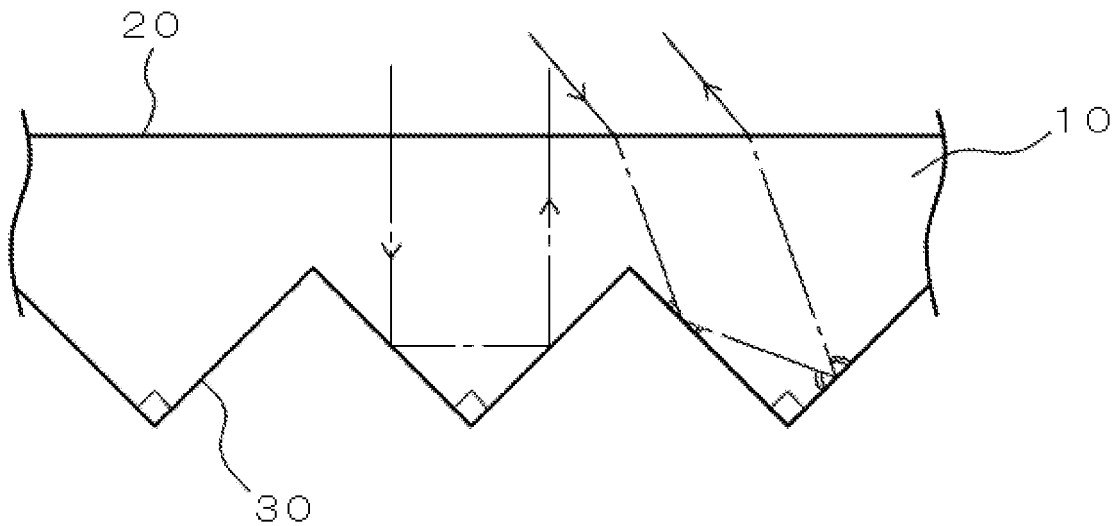
FIG. 1 is a main part cross sectional drawing of a retroreflective material of one embodiment of the present disclosure.

A retroreflective material of one embodiment of the present disclosure will be described in the following with reference to FIG. 1.

(Retroreflective Material)

This retroreflective material is provided with a reflector main body 10 that has optical transparency. The reflector main body 10 is formed from agar. In this way, the reflector main body 10 has a refractive index of greater than 1, and preferably larger than 1.3. A detailed compositional example of the agar will be described later.

One side of the reflector main body 10 (the upper surface in FIG. 1) constitutes an incident surface 20 where incident light enters into the reflector main body 10. With this embodiment, the incident surface 20 is made a flat surface, but it is also possible to form various shapes in accordance with the intended use.

The other side of the reflector main body 10 (the lower surface in FIG. 1) is formed as a retroreflective surface 30 that reflects incident light that has entered to an inner part of the reflector main body 10 in a direction substantially parallel to an incident direction. The directions of incident light and reflected light for the retroreflective material of this example are shown by the dot and dash lines in FIG. 1.

The retroreflective surface 30 of this embodiment constitutes a corner cube type retroreflective surface. However, in FIG. 1, a two-dimensional shape of the retroreflective surface is described in order to avoid complication. The actual retroreflective surface 30 consists of three precise planes being combined at respective right angles into a shape that forms a vertex, and is constructed to reflect light in a light source direction by performing total reflection at a respective surface.

(Study of Usage Materials)

Study details of usage materials constituting a reflector main body will be described in the following.

(Necessary Conditions)

With this embodiment, foodstuffs satisfying the following conditions were studied:

(1) can be eaten and are not toxic, etc., (2) transmissivity is high and attenuation of light is low, (3) light reflectivity is high with high refractive index, and (4) has fluidity, etc., and so can be poured into a mold, and can be precisely formed into, and maintain, a corner cube shape by being solidified by some kind of operation.

(Determination of Materials)

In order to choose a material from which to make a retroreflective material that can be eaten, first of all the following five foodstuffs were considered as candidates from the viewpoint of being close to transparent. The five materials were reduced palatinose, sodium alginate gel, glucomannan, a mixture of locust bean gum and carrageenan (hereafter referred to as carrageenan mixture), and agar. It was investigated whether the candidate materials were suitable for a retroreflective material, as well as satisfying the previously described conditions.

Compositions of each of the materials are shown in Table 1 below.

TABLE 1

| sodium alginate gel | |
|---|---|
| sodium alginate | 2 g |
| calcium lactate | 8 g |
| water | 800 ml (added to calcium lactate) |
| | 100 ml (added to sodium alginate) |
| glucomannan | |
| glucomannan | 10 g |
| calcium hydroxide | 0.6 g |
| water | 360 g |
| reduced palatinose | |
| Palatinit (trade name) | 100 g |
| water | 30 g |
| locust bean gum/carrageenan mixture | |
| Cool Agar (trade name) | 15 g |
| water | 100 g |
| agar | |
| powder agar | 4 g |
| granulated sugar | 75 g |
| starch syrup | 20 g |
| water | 250 g |

Condition (1) was satisfied by all of the materials studied.

Figure 2:
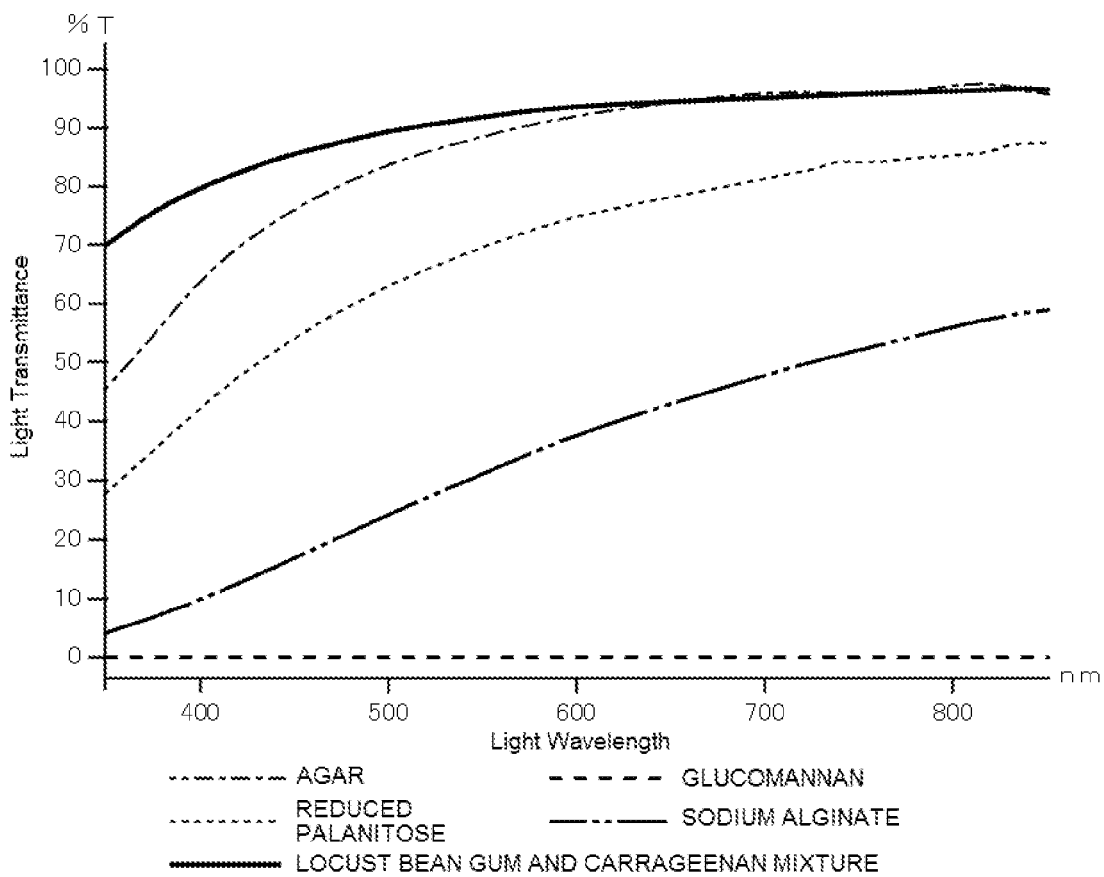
FIG. 2 is a graph showing light transmittance of used foodstuffs that were studied as candidates, with the horizontal axis showing light wavelength and the vertical axis showing light transmittance.

For condition (2), respective transmissivities were measured using a spectrophotometer. The results of these measurements are shown in FIG. 2. It should be noted that the measurement range was made visible light, and the measurement was performed by putting a sample inside a PMMA material cell having a thickness of 12.5 mm.

Measurement conditions are shown in Table 2 below.

TABLE 2

| devices used | |
|---|---|
| U-300 type spectrophotometer | Made by Hitachi Ltd. |
| measurement conditions | |
| light wavelength range | 190-1100 nm |
| scan speed | 300 nm/min |

TABLE 2-continued

| | |
|---|---|
| sampling interval | 0.50 nm |
| measured volume of sample cell (disposable type) | 3.5 ml |
| Material | PMMA (acrylic resin) |
| optical path width (width in which light can pass) | 10 mm |

From these results it will be understood that transmissivity of the carrageenan mixture and the agar is comparatively high. However, with materials other than those two, at many wavelengths transmissivity was less than 70%, which can be considered to be low transmissivity.

Regarding the refractive index of condition (3), since it is possible to adjust the refractive index by adding sucrose or the like to the material, it is possible to make the refractive index high regardless of the material simply by utilizing this adjustment. In other words, this required condition is satisfied with any material.

Regarding condition (4), materials that have good workability with regard to formation are the agar and carrageenan mixture that are used as a solidifier for jelly. Although the reduced palatinose also has fluidity and can also be worked, melting point is high at 170° C., and also degree of difficulty of modeling is high as viscosity is high. Since modeling at high temperature requires a metal mold, it was judged that the reduced palatinose had low utility.

With the agar and the carrageenan mixture, it was possible to pour into a mold, but differences in characteristics during manufacture were seen with these two materials. The agar had low viscosity in a liquid state, and after solidification had a characteristic whereby it was possible to precisely transfer a shape. On the other hand, the carrageenan mixture had high viscosity in liquid form, and hardened after coagulation, but did not precisely transfer a shape, and further had water attached to the surface. It was therefore understood that regarding accurately modeling and maintaining a corner cube shape, agar was the better option.

From the above results, with this embodiment, agar was used as a material for a retroreflective material.

Figure 3:
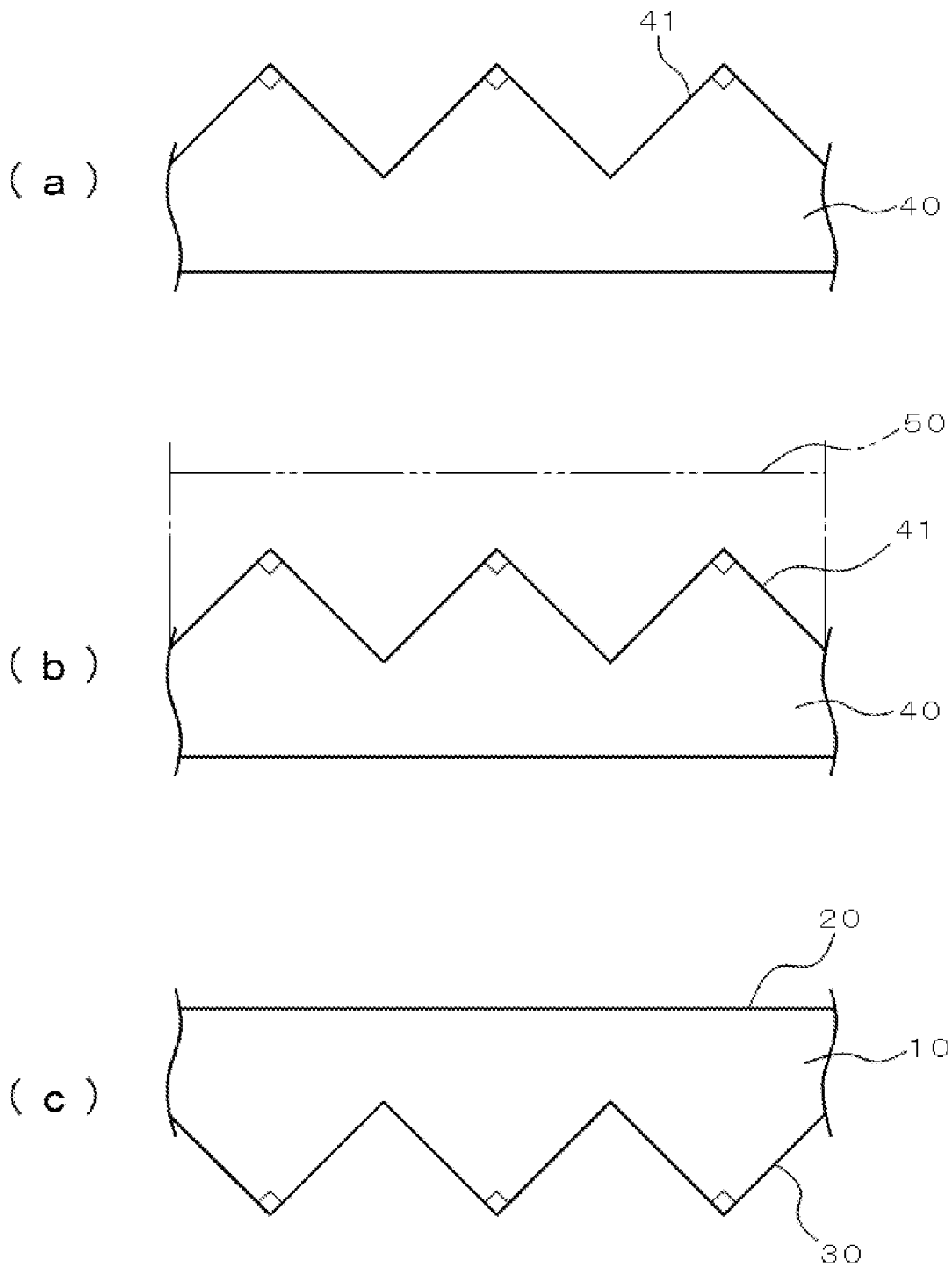
FIG. 3 is an explanatory drawing for describing one example of a method of manufacturing the retroreflective material in FIG. 1.

(Manufacturing method for retroreflective material of this embodiment) Next, a specific example of a procedure for manufacturing the retroreflective material of this embodiment will be described with further reference to FIG. 3.

(FIG. 3(a))

A base material 40 for forming the previously described retroreflective surface 30 is prepared. A surface 41 of the base material 40 is formed in the shape of a corner cube type retroreflective surface 30.

On the other hand, agar material is added to water and heated. In this way it is possible to obtain an agar solution 50 (refer to FIG. 3(b), which will be described later). A specific compositional example of the agar solution will be described later.

(FIG. 3(b))

Next, the agar solution 50 is poured towards the surface 41 of the base material 40, and the agar solution 50 is brought into contact with the surface 41. In this way, the shape of the surface 41 of the base material 40 is transferred to the agar solution 50. It should be noted that the liquid surface of the agar solution 50 is shown by the two-dot chain line in FIG. 3(b).

The agar solution 50, in a state of having been brought into contact with the surface 41 of the base material 40, is then made to coagulate (gelation) by cooling. In this way it is possible to form a reflector main body 10 having the retroreflective surface 30 on a counterface surface to the surface 41.

(FIG. 3(c))

Next, the reflector main body 10 that was obtained by solidification is separated from the base material 40. As a result it is possible to obtain a retroreflective material that has the structure of this embodiment described previously.

Experimental Example 1

A more specific example of a manufacturing method for a retroreflective material will be described as experimental example 1.

(1) 250 g of water was added to 4 g of agar material (powdered agar), and heated.

(2) After the agar material was completely dissolved, 75 g of granulated sugar and 20 g of refined sugar were added, and these sugars were completely dissolved. In this way, an agar solution was obtained. It should be noted that the granulated sugar and refined sugar are equivalent to one example of a refractive index adjustment agent for improving the refractive index of the agar.

(3) Vacuum defoaming was performed while agitating the agar solution. In this way it was possible to improve the transparency of the agar solution.

(4) The agar solution was heated again, and temperature of the solution was made uniform while taking care not to cause boiling.

(5) A corner cube type retroreflective material (base material) was placed on a petri dish, and the agar solution was poured in from above the petri dish.

(6) The agar solution was cooled, and once this was completely solidified the base material was removed.

(Performance Evaluation . . . Illumination by Reflected Light)

Figure 4:
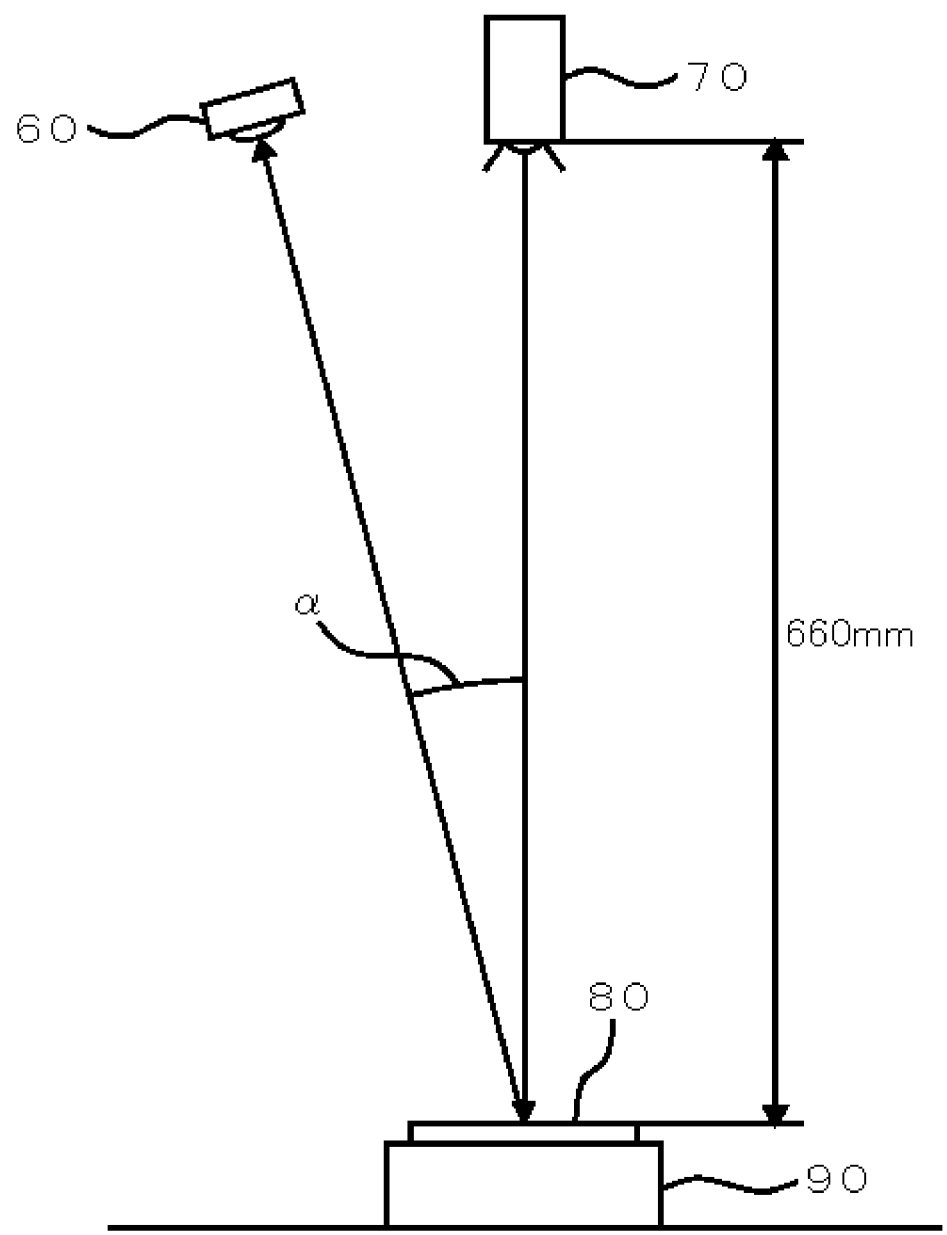
FIG. 4 is an explanatory drawing for describing experimental conditions for measurement of reflection illuminance in an experimental example 1.

The extent to which the retroreflective material of the agar of experimental example 1 that was produced reflects light was evaluated by measuring the strength of that reflection using an illumination meter 60 (As One LM-331), a light source 70 (HOYA-SCHOTT MEGALIGHT100) and a desk darkroom (Aswan ADR-D1, not shown), and for comparison, using a corner cube type retroreflective material available on the market (comparative example 1), and a bead type retroreflective material (3M Scotchlight reflection cloth 8965, comparative example 2). A structural diagram of the experiment conditions is shown in FIG. 4. It should be noted that an observation angle α formed by the light source and the illumination meter was made 1.5°, and a distance from the light source 70 to a sample 80 on a pedestal 90 was made 660 mm. Measurement results were that when a light source illuminance was 449 lx, illuminance of reflected light from the corner cube type reflective material (comparative example 1) was 32 lx, illuminance of reflected light from the bead type retroreflective material (comparative example 2) was 12.5 lx, illuminance of reflected light from the agar (experimental example 1) was 48.3 lx, and illuminance of reflected light with no sample (only the pedestal 90) was 6 lx. From the results, it was understood that the retroreflective material of agar that was produced reflected about 10% of light of the light source, and that there was a reflection intensity of equal to or more than for the commercially available bead type retroreflective material (comparative example 2) at the angle that was measured. It is conceivable that the reason that the illuminance of the reflective material that was produced was numerically higher than that of the commercially available corner cube type retroreflective material (comparative example 1) here is that the commercially available retroreflective material (comparative example 1) exhibits higher precision retroreflection with little diffused light, and a lot of light is reflected in the light source direction, and thus light that is incident on the illumination meter 60 that is arranged forming the angle of 1.5° is reduced. On the other hand, it is conceivable that more light is incident on the illumination meter because the retroreflective material that was trialed reflects light in a wider range than the commercially available reflector.

From the results of the previously described experiments, it is possible to confirm while the retroreflective material of this embodiment has agar, which is food, as a material, it has a reflection intensity close to that of an existing bead type retroreflective material, and that it would be effective as a marker for a camera. From this it is expected that it will be easy to perform projection mapping, etc., onto food by making markers using this retroreflective material, for example. It is also expected that this retroreflective material will also be suitable for use by being placed inside the digestive tract, such as the stomach.

Experimental Example 2

As experimental example 2, differences depending on type of agar material (bar-style agar, strip agar, and powder agar) were confirmed. It should be noted that manufacturing conditions for the agar used in experimental example 2 were basically the same as for experimental example 1. However, in experimental example 2, additives (specifically, granulated sugar and refined sugar) were not added.

Results are shown below.
refractive index
bar-style agar: 1.3364
strip agar: 1.3431
powder agar: 1.3379
reflection illuminance (lux)
light source illuminance: 413
bar-style agar: 20.5
strip agar: 20.2
powder agar: 18.4

An image was projected onto the retroreflective material that was formed with the previously described material, and an image obtained by taking a picture of a reflection of that image using a camera was observed. Regardless of which material was used, it was possible to observe a sufficiently practical reflected image. It should be noted that, as a subjective observation, with the bar-style agar the reflected image appeared to be slightly inferior compared with the other materials.

Experimental Example 3

As experimental example 3, differences depending on content of agar material (4 g, 2 g, 1 g) were confirmed. It should be noted that manufacturing conditions for the agar used in experimental example 3 were basically the same as for experimental example 2. However, with experimental example 3 powder agar was used as the agar material.
refractive index
4 g: 1.3400
2 g: 1.3350
1 g: 1.3336
reflection illuminance (lux)
light source illuminance: 412
4 g: 17.4
2 g: 15.5
1 g: measurement not possible (it was not possible to maintain shape)
4 g: (agar in a state where a corner cube shape was not formed): 12.3

However, if content was made smaller than 4 g, deformation of the shape of the retroreflective surface became large, and confirmation of a reflected image with a camera became difficult.

It should be noted that the content of the present disclosure is not limited by the previously described embodiment. The present disclosure may additionally be subject to various changes to the basic structure, within a range disclosed in the scope of the patent claims.

For example, with the previously described embodiment, granular sugar and refined sugar were used as a refractive index adjustment agent, but either one of those components can be omitted. Also, besides these two components, it is also possible to use appropriate sucrose or saccharides. Further, the refractive index adjustment agent is not limited to saccharides, and another edible material may also be used.

Also, with the previously described embodiment, bar-style agar, strip agar, and powder agar have been exemplified as agar materials, but agar materials besides these may also be used. Finally, as the agar material it is possible to manufacture agar that exhibits a desired performance (refractive index and firmness).

DESCRIPTION OF THE NUMERALS 10 reflector main body
20 incident surface
30 retroreflective surface
40 base material
41 surface
50 agar solution The various embodiments described above can be combined to provide further embodiments. All of the non-patent publications referred to in this specification are incorporated herein by reference, in their entirety. Aspects of the embodiments can be modified, if necessary to employ concepts of the publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An edible retroreflective material comprising a reflector main body having optical transparency, wherein:
  the reflector main body is formed from an agar solution comprised primarily of agar and water;
  one surface side of the reflector main body constitutes a plane of incidence where incident light enters to an inner part of the reflector main body; and
  the other side of the reflector main body is formed as a retroreflective surface that reflects incident light that has entered to the inner part of the reflector main body in a direction substantially parallel to an incident direction.

2. The edible retroreflective material of claim 1, wherein the retroreflective surface is a corner cube type retroreflector surface.

3. The edible retroreflective material of claim 1, wherein a refractive index adjustment material that increases a refractive index of the reflector main body is added to the agar solution constituting the reflector main body.

4. The edible retroreflective material of claim 3, wherein the refractive index adjustment material includes a sucrose or saccharide.

5. The edible retroreflective material of claim 3, wherein the refractive index adjustment material includes sugar.

6. The edible retroreflective material of claim 3, wherein the refractive index adjustment material includes a starch syrup.

7. A manufacturing method for an edible retroreflective material, comprising:
   obtaining an agar solution by adding agar material to water and heating, wherein the agar solution is comprised primarily of agar and water;
   bringing the agar solution into contact with a base material surface having a shape of a corner cube type retroreflector surface and transferring the shape of the base material surface to the agar solution; and
   forming an edible retroreflective material having a retroreflective surface by causing the agar solution, in a state of having been brought into contact with the base material surface, to solidify.

8. The manufacturing method of claim 7, further comprising adding a refractive index adjustment material to the agar solution, wherein the refractive index adjustment material increases a refractive index of the retroreflective material.

9. The manufacturing method of claim 8, comprising adding a sucrose or saccharide to the agar solution as the refractive index adjustment material.

10. The manufacturing method of claim 8, comprising adding sugar to the agar solution as the refractive index adjustment material.

11. The manufacturing method of claim 8, comprising adding a starch syrup to the agar solution as the refractive index adjustment material.

12. An edible retroreflective material, comprising:
   a reflector main body consisting of agar and water, wherein:
      the reflector main body is optically transparent,
      the reflector main body has a first surface side constituting a plane of incidence where incident light enters to an inner part of the reflector main body in an incident direction; and
      the reflector main body has a second side constituting a retroreflective surface that reflects incident light that has entered to the inner part of the reflector main body in a direction substantially parallel to the incident direction.

13. The edible retroreflective material of claim 12, wherein the retroreflective surface is a corner cube type retroreflector surface.

14. The edible retroreflective material of claim 12, wherein a refractive index adjustment material is added to the agar and water to increase a refractive index of the reflector main body.

15. The edible retroreflective material of claim 14, wherein the refractive index adjustment material is a sucrose or saccharide.

16. The edible retroreflective material of claim 14, wherein the refractive index adjustment material is sugar.

17. The edible retroreflective material of claim 14, wherein the refractive index adjustment material is a starch syrup.

* * * * *